April 14, 1964 A. J. DE VRIES 3,129,288

FREQUENCY MODULATION RECEIVER

Filed Sept. 10, 1962

INVENTOR.

Adrian J. De Vries

BY

Francis W. Crotty

Atty.

United States Patent Office 3,129,288
Patented Apr. 14, 1964

3,129,288
FREQUENCY MODULATION RECEIVER

Adrian J. De Vries, Elmhurst, Ill., assignor to Zenith Radio Corporation, Chicago, Ill., a corporation of Delaware Filed Sept. 10, 1962, Ser. No. 222,545
13 Claims. (Cl. 179—15)

Figure 1:
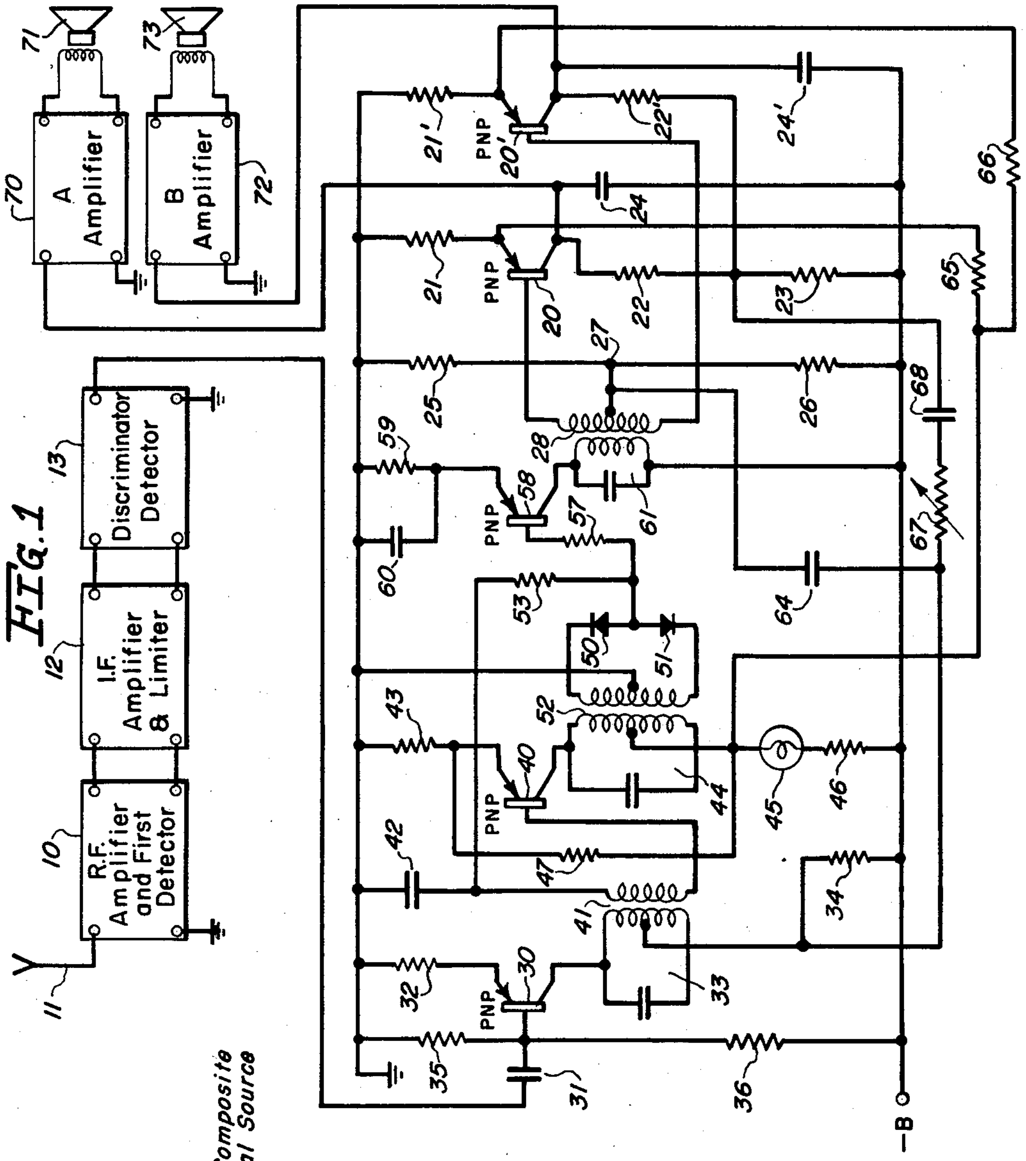

The present invention concerns the structural features of a frequency-modulation receiver which may be employed for the reception of monophonic or stereophonic broadcast programs. Certain features of the receiver represent further development of the frequency-modulation receivers described and claimed in copending applications Serial No. 22,830, filed April 18, 1960 and Serial No. 118,009, filed June 19, 1961, both in the name of Adrian J. De Vries and both assigned to the assignee of the present invention. To the extent that the receiver to be described is a further development of the structures of these copending applications, the instant case is a continuation-in-part of such earlier filed applications.

The several receiver arrangements alluded to thus far are especially suited for the reception of frequnecy-modulation stereophonic broadcasts conducted under the authorization, and in accordance with the specifications, of the Federal Communications Commission. Application Serial No. 22,830 discloses a synchronous demodulator which may include a beam deflection tube for deriving the two audio signals characteristically transmitted in any system of stereophonic broadcasting. That application makes clear that one audio signal may be recovered in the load circuit of one of the two anode segments of a beam deflection tube while the other audio signal may be derived from the load circuit of the remaining anode segment. In each case, however, there is a residuum of unwanted signal component which may be cancelled out by matrixing with a signal derived from a cathode load of the deflection demodulator. The present arrangement is a more simplified receiver structure both from the standpoint of the detecting device that is employed and also in the matter of detector efficiency and matrixing simplicity.

The other application Serial No. 118,009 discloses a synchronous demodulator employing a pair of diodes. This demodulator develops the two audio signals by operating upon the signal output of the frequency-modulation detector of the receiver and accomplishes clean separation of the audio signals by matrixing but here the matrixing signal is obtained from the frequency-modulation detector or some subsequent stage of the receiver which has been arranged to provide a balanced output, that is to say, outputs of opposing polarities. The detector of the receiver that it to be described herein represents a still further simplification in that the need of a balanced output is avoided; there is no requirement to include in the receiver circuitry for phase inverting the output signal of the frequency-modulation detector for the purpose of obtaining a matrixing signal of appropriate polarity. Additionally, the arrangement to be described has superior detecting efficiency.

Accordingly, it is a principal object of the invention to provide a novel and improved receiver capable of either monophonic or sterophonic signal reproduction.

It is another and specific object of the invention to provide a new and improved detector and matrixing arrangement for a receiver for utilizing a stereophonic program broadcast in accordance with the specifications of the Federal Communications Commission.

It is another specific object of the invention to provide a novel detecting arrangement for demodulating a suppressed-carrier amplitude-modulated signal.

A receiver, constructed in accordance with the invention, is especially useful for reproducing a stereophonic program which comprises a carrier frequency-modulated in accordance with the sum of two audio signals and also in accordance with a subcarrier signal which, in turn, has been suppressed-carrier ampltiude-modulated with the difference of the same two audio signals. Structurally, the receiver comprises a frequency-modulation detector responsive to the received carrier for deriving a composite signal representing the modulation of that carrier. An amplitude-modulation detector is also provided. It includes at least one transistor having three electrodes, a detecting circuit comprising one pair of those electrodes, and a phase-reversing circuit coupled to the detecting circuit and comprising another pair of the electrodes for reversing the polarity of the detected signal developed in the detecting circuit. There are means for applying to the amplitude-modulation detector a demodulation signal corresponding to the carrier component of the suppressed-carrier signal and for simultaneously applying to the amplitude-modulation detector the composite signal derived in the frequency-modulation detector to develop in the phase-reversing circuit a combination of the audio signals conveyed to the received carrier. Finally, there are means for applying the composite signal from the frequency-modulation detector to the phase-reversing circuit to matrix with the combination of the two audio signals developed therein in order to derive a particular one of the audio signals separated from the other.

In accordance with one specific aspect of the invention, the amplitude-modulation detector comprises a pair of three element transistors which are keyed or switched in alternation by means of the demodulation signal which is applied to those transistors in push-pull relation. Detection occurs in the base-emitter circuit of each such transistor and the detected signal is obtained, with a polarity reversal, in the collector circuit.

In another aspect of the invention the amplitude-modulation detector has the form of a single three element symmetrical transistor which has a base and two other electrodes performing the function of emitter and collector in alternation. With this simplified arrangement, employing but a single three element transistor, cleanly separated audio signals are developed in the load circuits connected to those two of its electrodes which function alternatively as emitter and collector.

Figure 2:
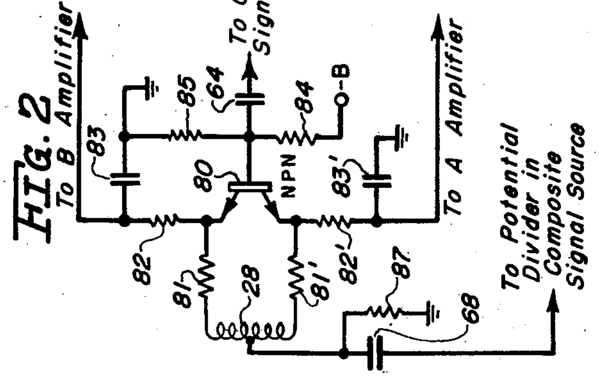

The foregoing and other objects of the invention which are believed to be novel are set forth with particularity in the appended claims. The organization and manner of operation of the invention, together with further objects and advantages thereof, may best be understood by reference to the following description taken in connection with the accompanying drawing in the several figures of which like reference numerals identify like elements, and in which:

FIGURE 1 is a schematic representation of a receiver embodying the present invention in one form; and FIGURE 2 is a schematic representation of an alternative form for the amplitude-modulation detector of the receiver of FIGURE 1.

The receiver arrangement of FIGURE 1 is capable of two distinctly different modes of operation and adjusts itself automatically between these modes in accordance with the character of the received signal. More particularly, the receiver may be employed for the reception of a frequency-modulation broadcast whether it be of the monophonic or stereophonic type and those portions of the receiver that are uniquely required for stereophonic operation are activated only during the reception of the stereophonic broadcast signal. It is convenient to describe the receiver initially as a stereophonic home type of instrument.

At the outset it is appropriate to comment upon the stereophonic program signal. Such a signal, as prescribed by the specifications of the Federal Communications Commission, comprises a carrier which is frequency-modulated in accordance with the sum of two audio signals. The carrier is also frequency-modulated in accordance with a subcarrier signal which has been suppressed-carrier amplitude-modulated with the difference of the same two audio signals. Since the transmission includes a suppressed-carrier component, a pilot signal is also frequency-modulated on the principal carrier to facilitate synchronization of receiving instruments. The program signal may be represented in accordance with the following modulation function:

$$M(t)=K_1(A+B)+K_2(A-B)S+K_3S' \quad (1)$$

where A and B are the two audio signals and the first term of the function represents their sum. The second term represents the fundamental modulation components of a suppressed-carrier amplitude-modulated subcarrier signal conveying the difference information of these audio signals, where the expression "fundamental components" means the first order modulation sidebands which attend the fundamental of the subcarrier and excludes higher order sidebands attendant the harmonics of the subcarrier signal. The fundamental of the subcarrier is designated S and S' is a pilot signal related in frequency to the fundamental frequency of the subcarrier. The pilot may be the same frequency as the fundamental of the subcarrier or it may have a subharmonic relation therewith, being one-half the fundamental for example. $K_1$–$K_3$ are constants; preferably $K_1$ and $K_2$ are equal and an order of magnitude larger than $K_3$ so that only a small portion, perhaps 10%, of the total deviation need be devoted to the transmission of the pilot signal. Preferred forms of a transmitter for developing and transmitting such a program signal are described and claimed in copending applications Serial No. 22,926, filed April 18, 1960 in the name of Robert Adler et al. and Serial No. 23,030, filed on the same date in the name of Carl G. Eilers, both of which applications are assigned to the assignee of the present invention.

The arrangement of FIGURE 1 comprises receiver circuits which, at least up to the first signal detector, are conventional. They include a radio-frequency amplifer of any desired number of stages and a heterodyning stage or first detector, both being represented by block 10. The input of the amplifying portion connects with a wave-signal antenna 11 and the output connects with a unit 12 which will be understood to include any desired number of stages of intermediate-frequency amplification and one or more amplitude limiters. Following the IF amplifier and limiter 12 is a frequency-modulation detector 13 responsive to the amplitude limited intermediate-frequency signal for developing a composite signal representing the modulation of the received carrier. Second detector 13 may be of any well known construction but since a high degree of amplitude limiting is desirable it is convenient that this unit be a ratio detector which exhibits limiting properties. The composite signal developed in the load circuit of detector 13 is defined by the function of Equation (1) and, from the foregoing description of that function, the second term is recognized as a suppressed-carrier amplitude-modulated subcarrier. Accordingly, this component must be demodulated in order to derive the separated audio signals and this is accomplished in an amplitude-modulation detector including at least one transistor having three electrodes. While complete amplitude demodulation may be accomplished with a single symmetrical type of three element transistor, the embodiment of FIGURE 1 makes use of a pair of amplitude-modulation detectors individually including three electrodes, a detecting circuit comprising one pair of those electrodes and a phase-reversing circuit coupled to the detecting circuit and comprising another pair of those electrodes for reversing the polarity of the detected signal that is developed in the detecting circuit.

More specifically, the amplitude-modulation detectors are comprised of transistors 20, 20', both of which are of the PNP type although their gender is of no particular consequence. Since their circuitry is essentially identical, only one will be described, namely, that of transistor 20. Its detecting circuit is the base-emitter circuit and includes an emitter resistor 21 while its phase-reversing circuit is the circuit of the collector and includes series connected resistors 22 and 23. Capacitor 24 connected in shunt relation to resistors 22 and 23 serves along with those resistors as a de-emphasis network that is usually included in a frequency-modulation receiver for the reason that it is common practice to employ pre-emphasis at the transmitter in order to attain an optimum signal-to-noise ratio in the system. Resistor 21 connects the emitter electrode to ground while resistors 22, 23 connect the collector to a bias source designated —B. The similarity of reference numerals associated with the circuit components connected to transistor 20' indicates the similarity of the amplitude-modulation detectors but it will be observed that the collector of transistor 20' connects to the bias source through resistor 22' and resistor 23, the latter being an impedance which is common to the phase-reversing circuits of both amplitude-modulation detectors. Both transistors 20 and 20' receive the customary bias from a voltage dividing network 25, 26 bridged from bias source —B to ground and having a common junction 27 which connects with the base electrode of each transistor through a center tap on a coil 28 which is the secondary winding of a coupling transformer.

In order to detect the suppressed-carrier amplitude-modulated subcarrier which conveys the difference information of the two audio components of the stereo program it is necessary to apply to both amplitude-modulation detectors 20, 20' a demodulation signal which corresponds to the carrier component of the subcarrier signal. The means for applying such a demodulation signal comprises an amplifier that is tuned to the pilot component of the composite signal from detector 13 and a frequency doubler, assuming of course that the pilot is one-half the frequency of the subcarrier.

The pilot amplifier is provided by another PNP transistor 30 having a base electrode coupled through a capacitor 31 to the output of detector 13. The emitter is connected to ground through a resistor 32 while the collector connects to bias source —B through a resonant circuit 33 which is tuned to the pilot frequency and through a resistor 34. The base of transistor 30 connects to the junction of resistors 35 and 36 which are connected across the bias supply and in this fashion, the transistor receives its operating bias.

Amplifier 30 is connected to a tuned amplifier including a similar transistor 40 having a base inductively coupled through a coil 41 to tuned circuit 33 of amplifier 30. The low potential terminal of coil 41 is returned to ground through a capacitor 42. The emitter electrode of transistor 40 is similarly grounded through a resistor 43 while the collector connects to the bias source through a resonant circuit 44 tuned to the pilot frequency and through the series arrangement of an indicator lamp 45 and a resistor 46.

Tuned amplifier 40 drives a frequency doubler comprising a pair of semi-conductor diodes 50 and 51 connected across the opposite terminals of a coil 52 which is inductively coupled to resonant circuit 44. The circuit of diodes 50, 51 may be likened to a full wave rectifier and a connection from their junction through a resistor 53 to the low potential terminal of coil 41 constitutes a regenerative feedback connection for amplifier 40. That amplifier is normally biased to cut off because of the potential applied to its emitter through lamp 45, resistors 46 and 47 and the regeneration increases the sensitivity and gain of the amplifier in the presence of a pilot carrier which indicates the receipt of a stereophonic program signal. This feature of the receiver is essentially the same as that described and claimed in applicant's copending application Serial No. 118,009, differing principally in that the pilot amplifiers in the subject application are transistorized whereas in the earlier application they are represented as vacuum tube circuits.

Finally, a resistor 57 connects the frequency doubler to another tuned amplifier including transistor 58. The emitter of this transistor is returned to ground through a resistor 59 bypassed by a capacitor 60 while the collector is coupled to the bias supply through a resonant circuit 61 that is tuned to the demodulation or switching signal, a signal at twice the pilot frequency. In the absence of an output signal from frequency doubler 50, 51 the base potential of transistor 58 is so low that this transistor is nearly at cut off. The inductive coupling of tuned circuit 61 to coil 28 is the circuit means by which the demodulation signal developed in the frequency doubler and amplified in amplifier 58 is applied in push-pull relation to the base electrode of transistors 20, 20'. If desired, one or more of tuned circuits 33, 34 and 61 may be adjustable to facilitate optimum phasing of the demodulation signal.

In addition to applying the demodulation signal to the amplitude-modulation detectors, it is of course necessary to supply the composite signal from frequency-modulation detector 13 and this is achieved through a connection which extends from load resistor 34 of amplifier 30 through capacitor 64 to the center tap of coil 28. From the center of that coil, the supply extends to the base electrodes of transistors 20, 20' and thus the composite signal is delivered to such transistors in push-push relation.

Transistors 20, 20' are biased to cut off in the absence of a received stereophonic program signal. This comes about through the connection from the high potential terminal of indicator lamp 45 through resistor 65 to the emitter of transistor 20 and through the parallel connection extending through resistor 66 to the emitter of transistor 20'.

The signal developed in the phase-reversing or the collector circuit of transistor 20 attributable to the detecting process represents predominantly one of the desired audio program signals but it does have an unwanted contribution, in small amount, of the other audio signal. In like fashion, the signal developed in the phase-reversing circuit of transistor 20' corresponds with the other audio signal and it too has an unwanted contribution of the first-mentioned audio signal. The unwanted signal contributions are eliminated by circuit means for applying the composite signal to the phase-reversing circuit of each of the amplitude-modulation detectors to matrix with the combination of audio signals there developed and derive the desired and cleanly separated audio signal in each such circuit. More specifically, the composite signal is delivered from the high potential terminal of resistor 34 in tuned amplifier 30 through an adjustable matrixing resistor 67 and a capacitor 68 to impedance 23 that is common to the collector circuits of both transistors 20, 20'. It will be observed that the composite signal is applied to resistor 23 in the same polarity as it is applied to the base electrodes of these transistors since a phase inversion of audio information is experienced in the translation of the detected audio signals from the detecting circuit of each such transistor to its collector or output circuit.

The separated A audio signal developed in the output of amplitude-modulation detector 20 is applied to the input circuit of an A audio amplifier 70 to which is coupled a loudspeaker 71. Similarly, the B audio signal developed in the collector circuit of amplitude detector 20' is delivered to the input of a B audio amplifier 72 which drives a loudspeaker 73. These speakers are arranged spacially to develop a stereophonic pattern in the area that they serve.

In considering the operation of the described receiver, it will be assumed initially that no signals are intercepted by antenna 11. In this no-signal condition amplifiers 40 and 58, frequency doubler 50, 51 and amplitude detectors 20, 20' are all substantially non-conductive whereas amplifier 30 is conditioned to accept and amplify the pilot component of a stereophonic program signal should such signal be received. For the assumed condition, however, there is no output obtained from the receiver.

Let it now be assumed that the receiver is tuned to intercept a stereophonic program signal. That signal is translated in the customary fashion through frequency-modulation detector 13 which, in response thereto, produces a composite signal corresponding to the modulation of the received carrier. The audio frequency information of that composite signal, as indicated in Equation 1, is the sum of the two program signals. Their difference information is the modulation of the suppressed-carrier amplitude-modulated subcarrier or the second term of Equation 1. This composite signal is delivered through capacitor 31 to amplifier 30 and is amplified in the usual way. The pilot component is transferred to tuned amplifier 40 for further amplification and then to frequency doubler 50, 51. The output of the frequency doubler is fed back through resistor 53 to increase the sensitivity of amplifier 40 and therefore increase the amplitude of the demodulation signal developed through the frequency multiplication. This demodulation signal is in turn amplified in amplifier 58 and supplied in push-pull relation to amplitude demodulators 20, 20'.

At the same time, as conduction in transistor 40 increases due to the regenerative effect, its collector current builds up and indicator lamp 45 turns on indicating stereophonic reception. The high potential terminal of indicator 45 becomes less negative which reduces the bias on the amplitude demodulators and conditions them for conduction as required to permit their detecting the subcarrier component and to translate the audio components of the composite signal. This subcarrier is concurrently applied through capacitor 64 to the base electrodes of the amplitude-modulation detectors which conduct in alternation to demodulate the subcarrier signal.

The demodulation signal causes transistor 20 to be conductive during negative half-cycles of the demodulation signal. In each such conductive interval, the action between base and emitter is similar to diode action and the modulation components of the amplitude-modulated subcarrier component of the composite signal are developed at resistor 21. These modulation components are then transferred from the emitter to the collector circuit and, in usual transistor operation, experience a polarity reversal. The audio-frequency components of the composite signal are likewise transferred in a manner analogous to cathode follower operation from the base to the emitter circuit of the transistor and they too are transferred with a polarity reversal to the collector circuit where they in effect combine or matrix with the audio-frequency components derived in the detection process of the amplitude-modulated subcarrier. There is incomplete matrixing in the emitter and collector circuits which, for the assumed conditions, develops predominantly the A audio signal but suffers from a residuum of the B audio signal. This unwanted residuum is cancelled by the matrixing connection afforded through adjustable resistor 67 to the common impedance 23 of the collector circuit. The effect of the matrixing is to deliver to A audio amplifier 70 cleanly separated A audio signals.

The operation at amplitude-modulation detector 20' is essentially the same but occurs on opposite half-cycles of the demodulation signal so that this detector develops predominantly the B audio signal with an unwanted contribution of A audio signal. The same matrix connection afforded by resistor 67, however, causes cleanly separated B audio to be developed in the collector circuit of transistor 20' for application to B audio amplifier 72. Of course, capacitors 24, 24' perform the desired de-emphasis to restore the audio components to their proper weight in the frequency spectrum and therefore speakers 71 and 73 are driven as required for stereophonic reproduction.

During the reproduction of a stereophonic program indicator lamp 45 is energized, providing an automatic indication of stereophonic reception. Moreover, while the stages of the receiver serving essentially only stereophonic purposes are normally biased to cut off, the reception of a stereophonic program causes these stages automatically to be conditioned as required for stereophonic reproduction.

The receiver as thus far described is quite similar in operation to the receiver claimed in applicant's application Serial No. 118,009 but it has distinct advantages. It is not necessary to provide a balanced output from frequency-modulation detector 13 or otherwise to invert the composite signal of the detector to obtain a matrix signal of the proper polarity. This results because amplitude demodulators 20, 20′ introduce a phase inversion of the audio information and therefore it is possible to use the output signal of frequency-modulation detector 13 directly for matrix purposes. Both the matrixing and de-emphasis functions are most easily accommodated. For example, the matrix signal is applied directly to resistor 23 of the de-emphasis network and matrixing is accomplished without introducing the loss or attenuation attendant the use of a separate matrixing network. Also, de-emphasis is obtained without requiring the addition of a network solely for this purpose. Furthermore, the input impedance of the amplitude-modulation detectors is a function of the $\beta$ of the transistors and is much higher than that of synchronous diodes so that the detector constitutes less of a load on the driving circuits than is the case with synchronous diodes. The detectors here exhibit a gain if emitter resistor 21 is smaller than resistor 22 and require less amplitude for the driving signal.

During the reception of a monaural signal, there is no component corresponding to the pilot signal of a stereophonic broadcast which is utilized to place into operation those stages of the receiver which have a function only during stereophonic reception. Indeed, the output of frequency-modulation detector 13, in response to a monaural broadcast, is simply the usual audio program signal. It is translated by amplifier 30 and is applied through matrix resistor 67 and capacitor 68 to the output circuits of both transistors 20 and 20′ which are now non-conductive. The connections extending from the output circuit of those transistors to amplifiers 70 and 72 cause such amplifiers to be driven by the audio signal for monaural reproduction in the usual manner. Of course, in this operation amplifiers 70 and 72 convey identical audio signals which have been de-emphasized in the network 22, 24.

Accordingly, the receiver is a two-mode instrument capable of responding to monaural as well as stereophonic broadcasts. It conditions itself automatically in accordance with the characteristics of the received program signal to exhibit the mode required for the proper reproduction of that signal.

The amplitude detection circuits in one constructed embodiment of the invention found to operate satisfactorily, employed the following circuit parameters which are given merely by way of illustration and in no sense by way of limitation:

| | |
|---|---|
| Resistors 21, 21′ | 15,000 ohms. |
| Resistors 22, 22′, 26 | 39,000 ohms. |
| Resistors 23, 25 | 4,700 ohms. |
| Resistors 65, 66 | 22,000 ohms. |
| Resistor 67 | 5,000 Ω. |
| Capacitors 24, 24′ | 2,000 micromicrofarads. |
| Capacitors 64, 68 | 1 microfarad. |
| Transistors 20, 20′ | Type 2N1372. |
| B bias | —20 volts. |
| Pilot signal frequency | 19 kilocycles. |

The modification of FIGURE 2 differs from that just described principally in the form of amplitude-modulation detector. Detectors 20, 20′ are the usual unsymmetrical transistors in that the functions of the emitter and collector electrodes are not interchangeable in any significant extent. In FIGURE 2, however, transistor 80 is of the symmetrical variety having a base and two other electrodes either of which may function as an emitter or a collector. Their load circuits are symmetrical and, under the influence of the demodulation signal one serves as an emitter while the other functions as collector for one-half cycle of the demodulation signal but for the next half-cycle their functions are reversed. To connect this form of amplitude-modulation detector into the arrangement of FIGURE 1, the base electrode is coupled through capacitor 64 to load resistor 34 of amplifier 30. Through this connection the composite signal obtained from frequency-modulation detector 13 is applied to the base of symmetrical NPN transistor 80. The demodulation signal, in this instance, is applied to those electrodes which may function alternately as emitter and collector, the connection being through capacitor 68 and resistor 87 preferably to the tap of a voltage divider that would be arranged in place of resistor 34 of amplifier 30 and may be used as a matrix control. The opposite terminals of coil 28 connect to these electrodes through resistors 81, 81′. Each such electrode is further coupled to ground through a de-emphasis network comprising, on the one hand, resistor 82 and a capacitor 83 and for the other electrode resistor 82′ and capacitor 83′. Resistors 84 and 85 are series connected between a bias source —B and ground and their junction connects with base electrode 80. This applies a back bias to the transistor and permits the detector to provide larger outputs than otherwise.

In the operation of this amplitude demodulator, during one particular half-cycle of the demodulation signal, one of the emitter-collector electrodes has the polarity required for it to function as an emitter. In this case it then follows the signal applied to the base while the opposite electrode, which has the opposite polarity of demodulation signal, now functions as a collector and develops in its load circuit a reversed polarity replica of the demodulated signal developed in the load circuit of the electrode instantaneously serving as emitter. On opposite polarity half-cycles of the demodulation signal the functions of the two emitter-collector electrodes reverse completely and symmetrically. If the effect of the matrixing signal is ignored, it may be shown that one of the load circuits, for example resistor 81 develops the difference information of the two audio signals of one polarity while the other load circuit 81′ develops the difference information but in opposite polarity. The matrix connection through capacitor 68 supplies the sum of the audio signals to these load circuits as required to accomplish matrixing to the end that one load circuit develops separated A audio while the other develops separated B audio for application to amplifiers 70, 72 and speakers 71, 73.

The embodiment of FIGURE 2 is a most simplified arrangement and has the distinct advantage of twice the detector efficiency of predecessor synchronous demodulators such as those utilizing a pair of diodes operated in a 50/50 duty cycle. There is another marked difference in that audio information applied to transistor 80 does not appear in any of the load circuits as audio information. Instead, it is converted into a subcarrier signal and makes no audio contribution.

It will be appreciated that the composite signal supplied to capacitor 68 for matrixing introduces a component of the subcarrier. This will cause some interaction in the detector and may be compensated by adjustment of the intensity of the matrixing signal.

The multi-mode feature of the receiver is preserved when the amplitude-modulation detector of FIGURE 2 is substituted for the pair of detectors 20, 20′ of FIGURE 1. Having made that substitution, in the presence of a monaural program signal, transistor 80 is non-conductive due to the influence of the bias applied to the base and the audio signal is supplied from coil 28 through both output circuits 82, 83 and 82′ 83′ to amplifiers 70 and 72, respectively.

It is preferred that matrixing be employed in the arrangement of FIGURE 1 as described because it provides optimum separation and equal outputs during monaural and stereophonic reproduction. However, matrixing may be omitted if the modulated-subcarrier component of the composite signal is exalted relative to the sum component of the composite signal. An illustrative network for adjusting these signal levels is shown in copending application, Serial No. 22,830. Additionally, peak detector action may be obtained, if desired, by the addition of capacitors across resistors 21, 21′ in FIGURE 1 and resistors 81, 81′ in FIGURE 2.

One form of symmetrical amplitude-modulation detector that has been employed successfully had the following circuit parameters:

| | | |
|---|---|---|
| Resistors 81, 81′ | ohms | 4,700 |
| Resistors 82, 82′ | do | 100,000 |
| Resistor 84 | do | 120,000 |
| Resistor 85 | do | 15,000 |
| Resistor 87 | do | 10,000 |
| Capacitors 83, 83′ | microfarads | 750 |
| Transistor 80 | Type | 2N1994 |

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:
- a frequency-modulation detector responsive to said carrier for deriving a composite signal representing the modulation of said carrier;
- an amplitude-modulation detector including at least one transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;
- means for applying to said amplitude-modulation detector a demodulation signal corresponding to the carrier component of said subcarrier signal and said composite signal to develop in said phase-reversing circuit a combination of said audio signals;
- and means for applying said composite signal to said phase-reversing circuit to matrix with said combination of said audio signals and derive a particular one of said audio signals separated from the other.

2. A receiver for using a stereophonic program comprising a carrier frequency-modulated with pre-emphasis in accordance with the sum of two audio signals and also in accordance with a subcarrier signal which has been suppressed-carrier amplitude modulated with the difference of said two audio signals, said receiver comprising:
- a frequency-modulation detector responsive to said carrier for deriving a composite signal representing the modulation of said carrier;
- an amplitude-modulation detector including at least one transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;
- a de-emphasis network included in said phase-reversing circuit;
- means for applying to said amplitude-modulation detector a demodulation signal corresponding to the carrier component of said subcarrier signal and said composite signal to develop in said phase-reversing circuit a combination of said audio signals;
- and means for applying said composite signal to said phase-reversing circuit to matrix with said combination of said audio signals and derive a particular one of said audio signals separated from the other.

3. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:
- a frequency-modulation detector responsive to said carrier for deriving a composite signal representing the modulation of said carrier;
- an amplitude-modulation detector including at least one transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;
- means for applying to said amplitude-modulation detector a demodulation signal corresponding to the carrier component of said subcarrier signal and one polarity of said composite signal to develop in said phase-reversing circuit a combination of said audio signals;
- and means for applying said composite signal with said one polarity to said phase-reversing circuit to matrix with said combination of said audio signals and derive a particular one of said audio signals separated from the other.

4. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:
- a frequency-modulation detector responsive to said carrier for deriving a composite signal representing the modulation of said carrier;
- a pair of amplitude-modulation detectors individually including a transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;
- means for applying to said amplitude-modulation detectors in push-pull relation a demodulation signal corresponding to the carrier component of said subcarrier signal and for concurrently applying to said amplitude-modulation detectors in push-push relation said composite signal to develop in each of said phase-reversing circuits a combination of said audio signals;
- and means for applying said composite signal to each of said phase-reversing circuits to matrix with said combination of said audio signals and derive in each of said phase-reversing circuits a particular one of said audio signals separated from the other.

5. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a pair of amplitude-modulation detectors individually including a transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;

means for applying to said amplitude-modulation detectors a demodulation signal corresponding to the carrier component of said subcarrier signal and for concurrently applying to said amplitude-modulation detectors said composite signal to develop in said phase-reversing circuits a combination of said audio signals, one of said demodulation and composite signals being applied to said amplitude-modulation detectors in push-pull relation and the other being applied in push-push relation;

and means for applying said composite signal to each of said phase-reversing circuits to matrix with said combination of said audio signals and derive in each of said phase-reversing circuits a particular one of said audio signals separated from the other.

6. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a pair of amplitude-modulation detectors individually including a transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;

an impedance common to both of said phase-reversing circuits;

means for applying to said amplitude-modulation detectors a demodulation signal corresponding to the carrier component of said subcarrier signal and for concurrently applying to said amplitude-modulation detectors said composite signal to develop in said phase-reversing circuits a combination of said audio signals, one of said demodulation and composite signals being applied to said amplitude-modulation detectors in push-pull relation and the other being applied in push-push relation;

and means for applying said composite signal to said common impedance of said phase-reversing circuits to matrix with said combination of said audio signals and derive in each of said phase-reversing circuits a particular one of said audio signals separated from the other.

7. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a pair of amplitude-modulation detectors individually including a transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;

means for applying to said detecting circuit of each of said amplitude-modulation detectors a demodulation signal corresponding to the carrier component of said subcarrier signal and for concurrently applying to said detecting circuit of each of said amplitude modulation detectors said composite signal to develop in said phase-reversing circuits of each of said amplitude-modulation detectors a combination of said audio signals, one of said demodulation and composite signals being applied to said amplitude-modulation detectors in push-pull relation and the other being applied in push-push relation;

and means for applying said composite signal to each of said phase-reversing circuits to matrix with said combination of said audio signals and derive in each of said phase-reversing circuits a particular one of said audio signals separated from the other.

8. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a pair of amplitude-modulation detectors individually including a transistor having three electrodes, a detecting circuit comprising one pair of said electrodes, and a phase-reversing circuit coupled to said detecting circuit and comprising another pair of said electrodes for reversing the polarity of the detected signal developed in said detecting circuit;

means for applying to said amplitude-modulation detectors in push-pull relation a demodulation signal corresponding to the carrier component of said subcarrier signal and for concurrently applying to said amplitude-modulation detectors in push-push relation said composite signal to develop in each of said phase-reversing circuits an output signal which predominantly represents one of said audio signals;

a pair of audio-frequency signal transducers;

and means for applying said output signals from said phase-reversing circuits to said transducers, respectively.

9. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

an amplitude-modulation detector including a single symmetrical transistor having a base electrode and a pair of electrodes functioning in alternation as emitter and collector, and further including a pair of similar load circuits connected to said pair of electrodes, respectively;

means for applying to said amplitude-modulation detector a demodulation signal corresponding to the carrier component of said subcarrier signal and said composite signal to develop in each of said load circuits a signal representing the difference of said two audio signals;

and means for applying to each of said load circuits at least the portion of said composite signal representing the sum of said two audio signals to matrix with the difference of said two audio signals and derive in each of said load circuits a particular one of said audio signals separated from the other.

10. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

an amplitude-modulation detector including a single symmetrical transistor having a base electrode and a pair of electrodes functioning in alternation as emitter and collector, and further including a pair of similar load circuits connected to said pair of electrodes, respectively;

means for applying to said pair of electrodes in push-pull relation a demodulation signal corresponding to the carrier component of said subcarrier signal and for concurrently applying to said base electrode said composite signal to develop in each of said load circuits a signal representing the difference of said two audio signals;

and means for applying to each of said load circuits at least the portion of said composite signal representing the sum of said two audio signals to matrix with the difference of said two audio signals and derive in each of said load circuits a particular one of said audio signals separated from the other.

11. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

an amplitude-modulation detector including a single symmetrical transistor having a base electrode and a pair of electrodes functioning in alternation as emitter and collector, and further including a pair of similar load circuits connected to said pair of electrodes, respectively;

means for applying to said amplitude-modulation detector a demodulation signal corresponding to the carrier component of said subcarrier signal and said composite signal to develop in each of said load circuits a signal representing the difference of said two audio signals;

and a connection from said frequency-modulation detector to said load circuits for applying to said load circuits said composite signal to matrix with the difference of said two audio signals and derive in each of said load circuits a particular one of said audio signals separated from the other.

12. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

an amplitude-modulation detector including a single symmetrical transistor having a base electrode and a pair of electrodes functioning in alternation as emitter and collector, and further including a pair of similar load circuits connected to said pair of electrodes, respectively;

means for applying a backward bias to said base electrode;

means for applying to said pair of electrodes in push-pull relation a demodulation signal corresponding to the carrier component of said subcarrier signal and for concurrently applying to said base electrode said composite signal to develop in each of said load circuits a signal representing the difference of said two audio signals;

and means for applying to each of said load circuits at least the portion of said composite signal representing the sum of said two audio signals to matrix with the difference of said two audio signals and derive in each of said load circuits a particular one of said audio signals separated from the other.

13. A wave signal receiver comprising:

an amplitude-modulation detector including a single symmetrical transistor having a base electrode and a pair of electrodes functioning in alternation as emitter and collector and further including a pair of similar load circuits connected to said pair of electrodes, respectively;

means for applying to said base electrode an amplitude-modulated carrier wave signal;

means for applying to said pair of electrodes in push-pull relation a demodulation signal having a frequency corresponding to the fundamental of said modulated carrier wave signal;

and means for deriving two output signals individually representing the modulation components of said carrier wave signal, one from each of said load circuits.

No references cited.